(12) United States Patent
Li (10) Patent No.: US 11,877,651 B2
(45) Date of Patent: Jan. 23, 2024

(54) FOLDABLE FOOD SERVING CART

(71) Applicant: TC Guangzhou Trading Co., Ltd, Guangdong Province (CN)

(72) Inventor: Yi Li, Guangdong Province (CN)

( * ) Notice: Subject to any disclaimer, the term of this patent is extended or adjusted under 35 U.S.C. 154(b) by 54 days.

(21) Appl. No.: 17/686,437

(22) Filed: Mar. 4, 2022

(65) Prior Publication Data

US 2023/0133881 A1 May 4, 2023

(30) Foreign Application Priority Data

Oct. 28, 2021 (CN) .......................... 202122609174.6

(51) Int. Cl.
| | | |
|---|---|---|
| A47B 31/04 | (2006.01) | |
| B62B 3/02 | (2006.01) | |
| A47B 31/02 | (2006.01) | |
| A47B 31/00 | (2006.01) | |

(52) U.S. Cl.
CPC .............. *A47B 31/04* (2013.01); *A47B 31/02* (2013.01); *B62B 3/02* (2013.01); *A47B 2031/002* (2013.01); *A47B 2031/003* (2013.01)

(58) Field of Classification Search
CPC ... A47B 31/04; A47B 31/02; A47B 2031/002; A47B 2031/003; B62B 3/02
USPC ....................................................... 280/651
See application file for complete search history.

(56) References Cited

U.S. PATENT DOCUMENTS

| | | | | |
|---|---|---|---|---|
| 5,333,540 | A | * | 8/1994 | Mazzocchi ......... A47J 37/0763 99/449 |
| 5,947,007 | A | * | 9/1999 | O'Grady ............. A47J 37/0718 99/449 |
| 9,731,740 | B1 | * | 8/2017 | Chafin .................. B62B 5/0003 |
| 11,517,105 | B1 | * | 12/2022 | Olsen ....................... A47B 3/00 |
| 2004/0050305 | A1 | * | 3/2004 | Han .......................... A47B 1/02 108/83 |
| 2006/0272630 | A1 | * | 12/2006 | Sanders .................. A47J 33/00 126/9 R |
| 2012/0017890 | A1 | * | 1/2012 | May .................... A47J 37/0763 29/428 |
| 2018/0220845 | A1 | * | 8/2018 | Dahle .................... A47J 47/005 |
| 2018/0332961 | A1 | * | 11/2018 | Butler .................... A47B 77/10 |
| 2020/0077789 | A1 | * | 3/2020 | Polidoros ............... A47B 31/04 |
| 2020/0214440 | A1 | * | 7/2020 | Johnson .................. B29C 49/42 |
| 2021/0092805 | A1 | * | 3/2021 | Bunya .................. H05B 6/1209 |
| 2021/0100358 | A1 | * | 4/2021 | Mims .................... G06Q 20/204 |
| 2022/0053928 | A1 | * | 2/2022 | Li ............................ A47F 10/06 |
| 2022/0087384 | A1 | * | 3/2022 | Bromley ................. A45C 13/28 |

* cited by examiner

*Primary Examiner* — John D Walters
*Assistant Examiner* — Hilary L Johns (57) ABSTRACT

A foldable food serving cart, including a stand, side stands, electric circuit assembly and a base stand; the stand includes a stand body. The side stands include a first side stand and a second side stand, which are respectively rotatably connected to left and right sides of the stand body, and provided with a sliding groove on their top parts; the stand further include a first horizontal beam where its left and right sides are respectively slidably connected to the sliding grooves. A supporting frame is defined by the stand, the first horizontal beam, the first side stand and the second side stand for cooking modules, which are powered by the electric circuit assembly, to be placed on its top part. The supporting frame is detachably connected on top of the base stand; wheels are provided on a bottom part of the base stand.

9 Claims, 7 Drawing Sheets

FOLDABLE FOOD SERVING CART

BACKGROUND OF THE INVENTION

The present utility model relates to the technical field of catering equipment, and more particularly to a foldable food serving cart.

Foldable food serving carts are often used in hotels, restaurants and large banquets for diners to serve food and even provide on-site cooking and other functions. However, conventional food serving carts, particularly food serving carts with cooking modules, generally have a larger size which causes difficulties in transportation and a waste of space resources during storage.

BRIEF SUMMARY OF THE INVENTION

In view of the above, it is necessary to solve the drawbacks of difficult transportation and storage of conventional food serving carts by providing a foldable food serving cart, which greatly reduces the space volume of a food serving cart after being folded for the convenience of transportation and storage, thereby solving the aforementioned drawbacks of conventional food serving carts.

The technical solutions of the present utility model are as follows:

A foldable food serving cart, comprising a stand, the stand comprises a stand body;

a pair of side stands, the side stands comprises a first side stand and a second side stand; the first side stand and the second side stand are rotatably connected to left and right sides of the stand body respectively; a sliding groove is provided on a top part of each of the first side stand and the second side stand; the stand further comprises a first horizontal beam; left and right sides of the first horizontal beam are slidably connected to the sliding grooves of the first side stand and the second side stand respectively;

a supporting frame is defined by the stand body, the first horizontal beam, the first side stand and the second side stand; a top side of the supporting frame is disposed with cooking modules;

a base stand, wherein the supporting frame is detachably connected on top of the base stand; a bottom part of the base stand is provided with a plurality of wheels.

Optional technical features are described below:

According to one of the embodiments, the stand body comprises a second horizontal beam, and vertical beams connected to left and right sides of the second horizontal beam respectively; the first side stand and the second side stand are rotatably connected to the vertical beams on left and right sides of the stand body respectively.

According to one of the embodiments, the stand body further comprises a bottom beam; two ends of the bottom beam are connected to the vertical beams respectively; a mounting frame whereon baffle boards are mounted is defined by the bottom beam, the second horizontal beam and the vertical beams.

According to one of the embodiments, mounting holes on which the baffle boards are mounted are provided on the vertical beams on the left and right sides of the stand body.

According to one of the embodiments, each of the first side stand and the second side stand comprises a horizontal rod and a vertical rod; a first end of the horizontal rod is rotatably connected to the stand body; a second end of the horizontal rod is connected to the vertical rod; the sliding groove is arranged on a top part of the horizontal rod.

According to one of the embodiments, a middle part of each of the first side stand and the second side stand is provided with a supporting rod whereon shelf boards are mounted; a first end of the supporting rod is rotatably connected to the stand body; a second end of the supporting rod is connected to the corresponding vertical rod of the corresponding side stand.

According to one of the embodiments, the wheels are castor wheels.

According to one of the embodiments, the base stand is provided with a plurality of insertion grooves into which the supporting frame is inserted.

According to one of the embodiments, a power socket assembly is provided on the first horizontal beam; the cooking modules are connected to the power socket assembly.

According to one of the embodiments, the power socket assembly comprises aviation plugs, multifunctional sockets and overload protectors.

The beneficial effects of the present utility model include:

Comparing to the prior art, the present utility model provides a foldable food serving cart, wherein during folding operation, the cooking modules are first removed from the supporting frame, and then the supporting frame is removed from the base stand. After that, the first horizontal beam slides from an end of the side stands towards the stand body and abuts to the stand body; then, the first side stand and the second side stand respectively turn inward towards each other, until both ends of the first side stand and the second side stand away from the stand body abut to the stand body to complete folding process of the supporting frame. Comparing to an unfolded food serving cart, the folded supporting frame of the folded food serving cart has a greatly reduced size which is convenient for transportation and storage, thereby solving the drawbacks of difficult transportation and storage of conventional food serving carts in the prior art.

Furthermore, the present utility model provides a foldable food serving cart, wherein during a folding process, the cooking modules and the base stand are separated from the supporting frame, so that the food serving cart is further reduced to more separated parts, and thus the supporting frame has an even smaller size after being folded, which is easier and more convenient for transportation and storage.

BRIEF DESCRIPTION OF THE DRAWINGS

Accompanying drawings forming a part of the present application are provided for further understanding of the present utility model; exemplary embodiments and descriptions of the present utility model are only intended to explain the present utility model, and do not constitute an improper limitation to the present utility model.

To describe the technical solutions in the embodiments of the present utility model more clearly, the following briefly introduces the accompanying drawings required for describing the embodiments; obviously, the accompanying drawings in the following description show merely some embodiments of the present utility model, and a person of ordinary skill in the art may still derive other drawings according to these accompanying drawings under the premise that no inventive effect is involved.

In the figures: 100 denotes the stand; 110 denotes the stand body; 120 denotes the first horizontal beam; 130 denotes the second horizontal beam; 140 denotes the vertical beams; 141 denotes the mounting holes; 150 denotes the power socket assembly; 151 denotes the aviation plugs; 152 denotes the multifunctional sockets; 153 denotes the overload protectors; 160 denotes the bottom beam; 210 denotes the first side stand; 220 denotes the second side stand; 230 denotes the sliding grooves; 240 denotes the horizontal rod; 250 denotes the vertical rod; 260 denotes the supporting rod; 300 denotes the base stand; 310 denotes the wheels; 320 denotes the insertion grooves; 400 denotes the cooking modules; 500 denotes the baffle boards; 600 denotes the shelf boards; 700 denotes the electric circuit assembly; 710 denotes the power plugs; 720 denotes the electrical leakage protectors; 730 denotes the electric circuit connecting wires.

DETAILED DESCRIPTION OF THE INVENTION

To better explain the objects, features and advantages of the present utility model, the following describes in detail the embodiments of the present utility model. In the following descriptions, specific details are only set forth to explain the present utility model, but the present utility model may be implemented in various methods other than those described herein; those skilled in the art may make similar modifications without departing from the essence of the present utility model, and thus the present utility model should not be limited by the following embodiments.

As illustrated in FIGS. 1-6, in an embodiment, a foldable food serving cart is provided, which comprises a stand 100, a pair of side stands, an electric circuit assembly 700 and a base stand 300; the stand 100 comprises a stand body 110. The pair of side stands comprises a first side stand 210 and a second stand 220; the first stand 210 and the second stand 220 are rotatably connected to left and right sides of the stand body 110 respectively; a sliding groove 230 is provided on a top part of each of the first side stand 210 and the second side stand 220; the stand 100 further comprises a first horizontal beam 120; left and right sides of the first horizontal beam 120 are slidably connected to the sliding grooves 230 of the first side stand 210 and the second side stand 220 respectively. A supporting frame is defined by the stand body 110, the first horizontal beam 120, the first side stand 210 and the second side stand 220; a top side of the supporting frame is disposed with cooking modules 400. The cooking modules 400 are powered by the electric circuit assembly 700, so that the cooking modules 400 can be directly adapted to cook food on the food serving cart. The supporting frame is detachably connected on top of the base stand 300; a bottom part of the base stand 300 is provided with a plurality of wheels 310 for staffs to push the food serving cart.

Specifically, in the present embodiment, during a folding operation, the cooking modules 400 are first removed from the supporting frame, and then the supporting frame is removed from the base stand 300. After that, the first horizontal beam 120 slides in the sliding grooves 230 from corresponding ends of the first side stand and the second side stand away from the stand body 110 towards the stand body 110, and abuts against the stand body 100; then, the first side stand 210 and the second side stand are rotated inwardly towards each other, until the corresponding ends of the first side stand 210 and the second side stand 220 away from the stand body 110 abut against the stand body 110, so that a folding process of the supporting frame is completed. Comparing to an unfolded food serving cart, a folded food serving cart has a greatly reduced size which is convenient for transportation and storage, thereby solving the drawbacks of difficult transportation and storage of conventional food serving carts in the prior art.

Preferably, the foldable food serving cart of the present utility model during a folding process has the cooking modules 400 and the base stand 300 separated from the supporting frame, so that the food serving cart is further reduced to more separated parts, and thus the supporting frame has an even smaller size after being folded, which is easier and more convenient for transportation and storage.

Figure 1:
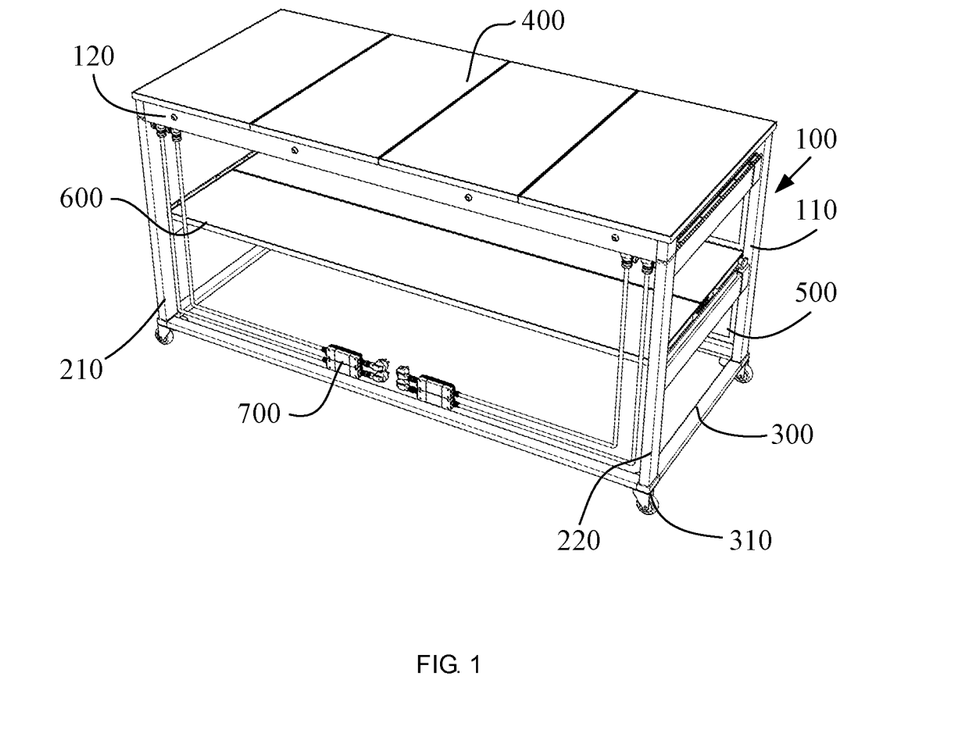
FIG. 1 shows a perspective view of the foldable food serving cart in one of the embodiments.
Figure 2:
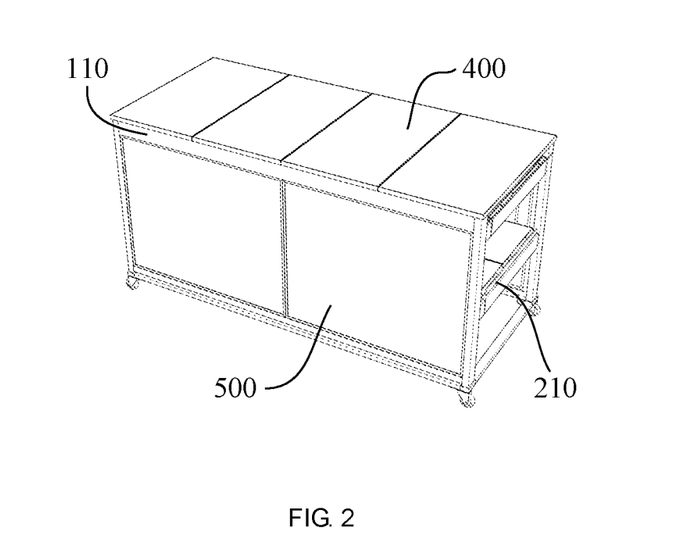
FIG. 2 shows a perspective view of the foldable food serving cart as in FIG. 1 with a combination of baffle boards according to one of the embodiments.
Figure 3:
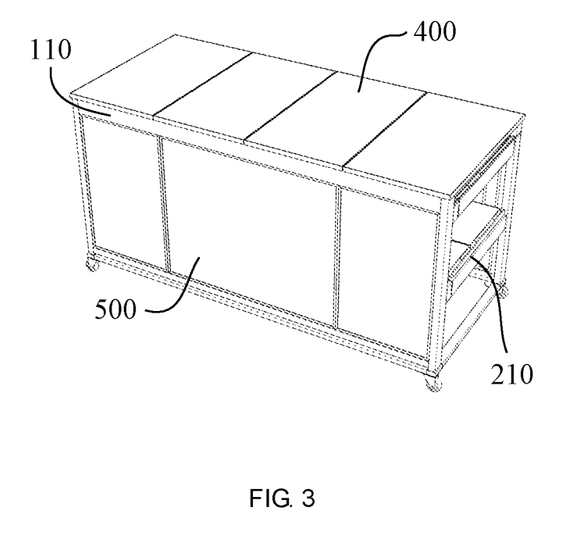
FIG. 3 shows a perspective view of the foldable food serving cart as in FIG. 1 with another combination of baffle boards according to one of the embodiments.
Figure 4:
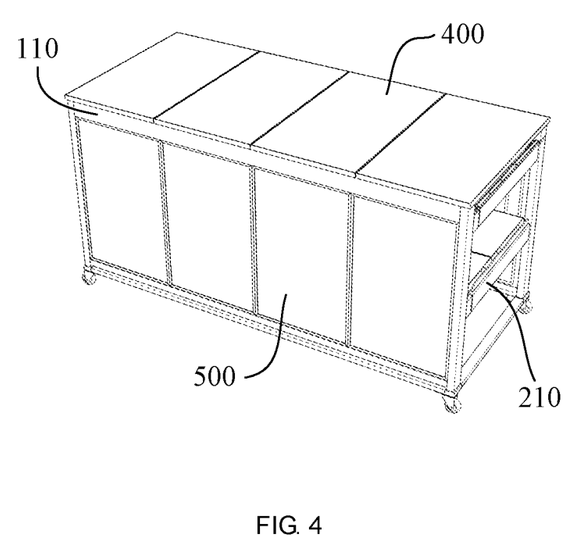
FIG. 4 shows a perspective view of the foldable food serving cart as in FIG. 1 with still another combination of baffle boards according to one of the embodiments.
Figure 5:
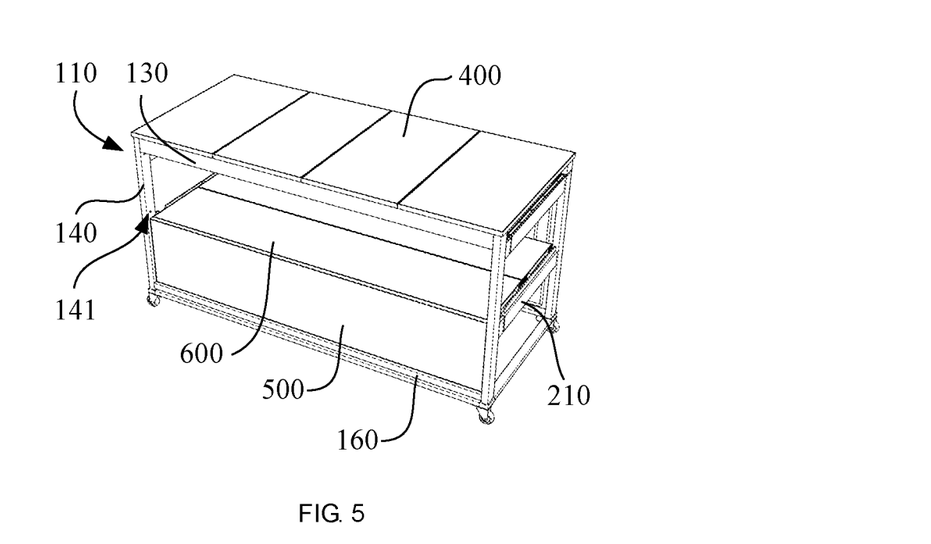
FIG. 5 shows a perspective view of the foldable food serving cart as in FIG. 1 with yet another combination of baffle boards according to one of the embodiments.

In one of the embodiments, the stand body 110 comprises a second horizontal beam 130, and a vertical beam 140 connected to each of left and right sides of the second horizontal beam 130; the first side stand 210 and the second side stand 220 are respectively rotatably connected to the vertical beams 140 on the left and right sides of the stand body 110.

Furthermore, the stand body 110 further comprises a bottom beam 160; two ends of the bottom beam 160) are connected to the vertical beams 140 respectively; a mounting frame is defined by the bottom beam 160, the second horizontal beam 130 and the vertical beams 140. Baffle boards 500 can be mounted onto the mounting frame. During usage, a side of the food serving cart where the stand body 110 is positioned faces towards diners. To prevent diners from accidentally touching any equipment or items inside the food serving cart, the baffle boards 500 are mounted on the stand body 110 to block access by the diners. When staffs are placing items into the food serving cart from one side, the baffle boards 500 further prevent items from falling out from an opposite side of the food serving cart, namely the side with where the stand body 110 is positioned.

Furthermore, as illustrated in FIGS. 2-5, the baffle boards 500 can be configured in different ways. For examples, a combination of two large baffle boards 500 arranged side by side, a combination of a larger baffle board 500 and multiple smaller baffle boards 500, a combination of multiple small baffle boards 500, or a combination of long baffle boards 500 arranged adjacently from top to bottom. Other ways of configuring the baffle boards 500 are available, including but not limited to the use of a single large baffle board 500, or any other combinations of baffle boards 500 with any irregular shape. In fact, any combination of baffle boards 500 that achieves a detachable mount of the baffle boards 500 onto the mounting frame and achieves the intended blocking function should fall within the protection scope of the present utility model.

In the present embodiment, each of the vertical beams 140 arranged on the left and right sides of the stand body 110 is provided with mounting holes 141 to fix and mount the baffle boards 500. Certainly, apart from the present embodiment, other methods to fix and mount the baffle boards 500 can be used, such as snap-fit connection and magnetic attraction; and those other methods shall also fall within the protection scope of the present utility model as long as the baffle boards 500 can be detachably fixed and mounted.

In one of the embodiments, each of the first side stand 210 and the second side stand 220 comprises a horizontal rod 240 and a vertical rod 250; a first end of the horizontal rod 240 is rotatably connected to the stand body 110; a second end of each horizontal rod 240 is connected to the vertical rod 250; the sliding groove 230 is arranged on a top part of the horizontal rod 240. During an unfolding operation of the food serving cart, rotate the horizontal rod 240 of the first side stand 210 outwardly from the stand body 110 and stop once the horizontal rod 240 is positioned to form an angle of ninety degrees with respect to the stand body 110, and the horizontal rod 240 of the second side stand 220 rotates in the same way, so that four supporting columns of the food serving cart are defined by the vertical rods 250 of the first side stand 210 and the second side stand 220, and the vertical beams 140 on the left and right sides of the stand body 110. After that, the first horizontal beam 120 slides away from the stand body 110 via the sliding grooves 230 on the top parts of the horizontal rods 240, and slides to ends of the horizontal rods 240 away from the stand body 110, so that an unfolding process of the supporting frame defined by the first side stand 210, the second side stand 220 and the stand 100 is completed. After that, components including the cooking modules 400, the baffle boards 500 and the base stand 300 are mounted to the supporting frame, and the food serving cart is thus completely assembled.

Furthermore, a middle part of each side stand is provided with a supporting rod 260 for placing shelf boards 600; a first end of each supporting rod 260 is rotatably connected to the stand body 110; a second end of each supporting rod 260 is connected to the corresponding vertical rod 250 of the corresponding side stand. By arranging the shelf boards 600, kitchen tools and ingredients not in use can be placed inside the food serving cart ready for staffs to use at any time.

In one of the embodiments, the wheels 310 are castor wheels, which are convenient for staffs to push the food serving cart in all directions, thereby making a moving operation of the food serving cart more convenient.

In one of the embodiments, the base stand 300 is provided with a plurality of insertion grooves 320 for insertion by the supporting frame, so that the supporting frame can be conveniently assembled and disassembled through insertion connection with the insertion grooves 320. In the present embodiment, the supporting frame is inserted to the insertion grooves 320 through the vertical rods 250 of the first side stand and the second side stand, and the vertical beams 140 of the stand 100.

Figure 6:
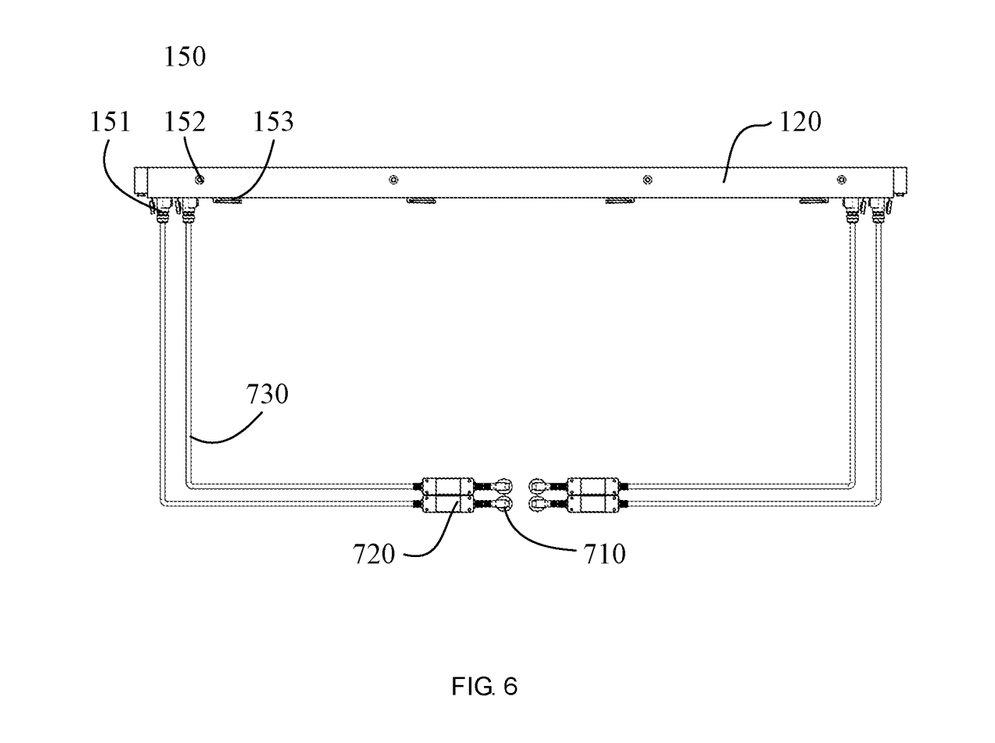
FIG. 6 shows a structural view of the electrical circuit connection of the foldable food serving cart as in FIG. 1.
Figure 7:
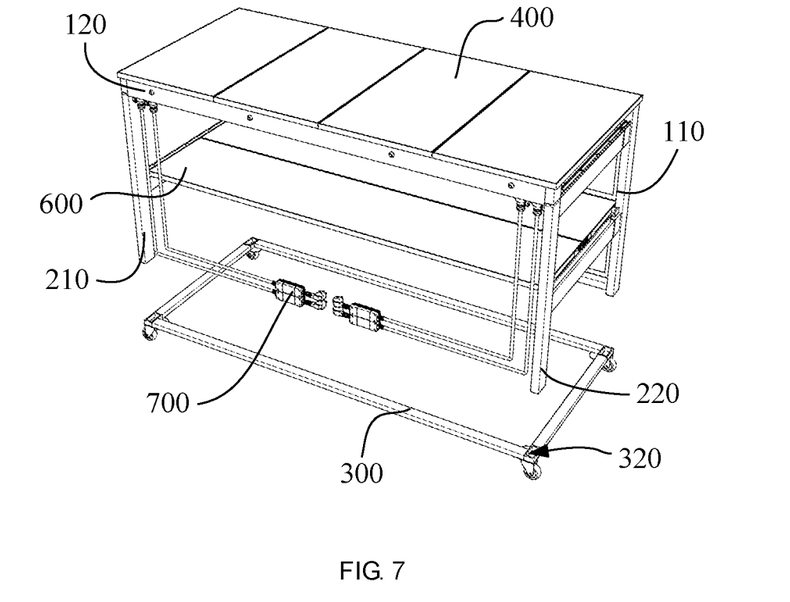
FIG. 7 shows a perspective view of one of the folding steps of the foldable food serving cart as in FIG. 1.
Figure 8:
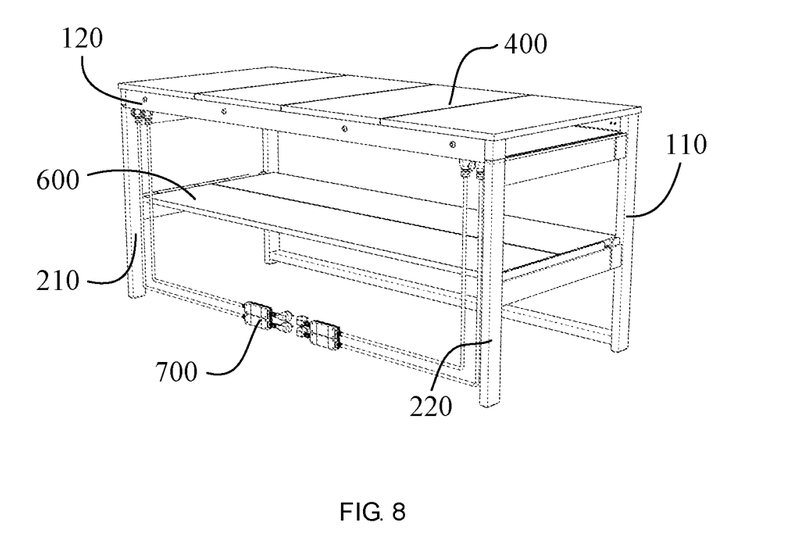
FIG. 8 shows a perspective view of one of the folding steps of the foldable food serving cart as in FIG. 1.
Figure 9:
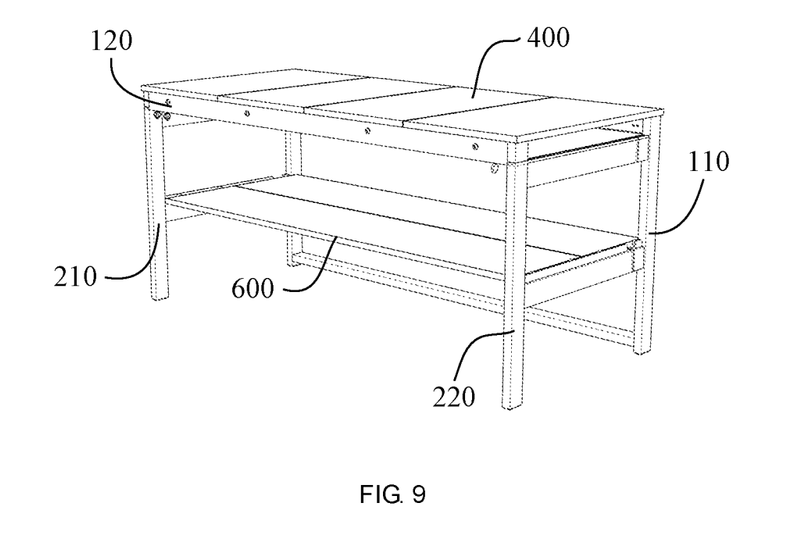
FIG. 9 shows a perspective view of one of the folding steps of the foldable food serving cart as in FIG. 1.
Figure 10:
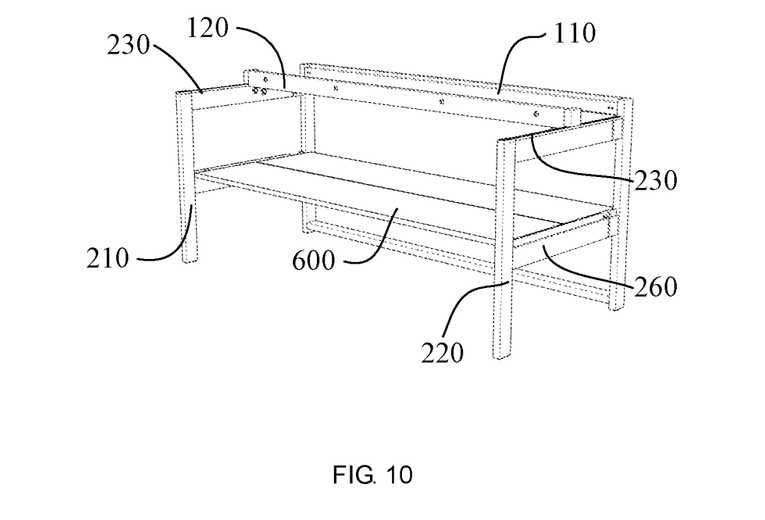
FIG. 10 shows a perspective view of one of the folding steps of the foldable food serving cart as in FIG. 1.
Figure 11:
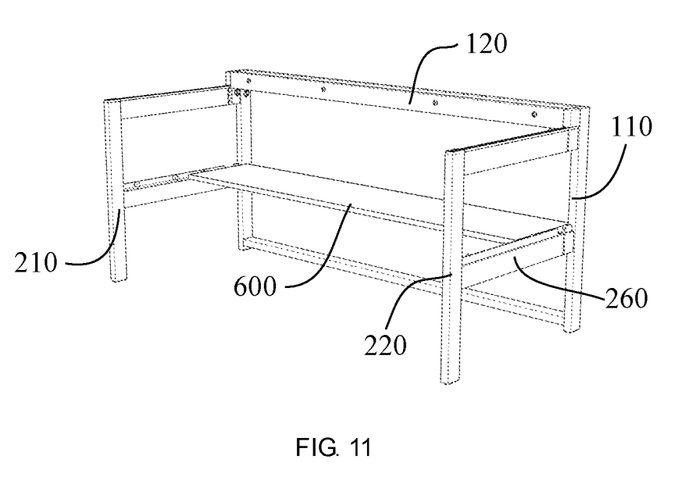
FIG. 11 shows a perspective view of one of the folding steps of the foldable food serving cart as in FIG. 1.
Figure 12:
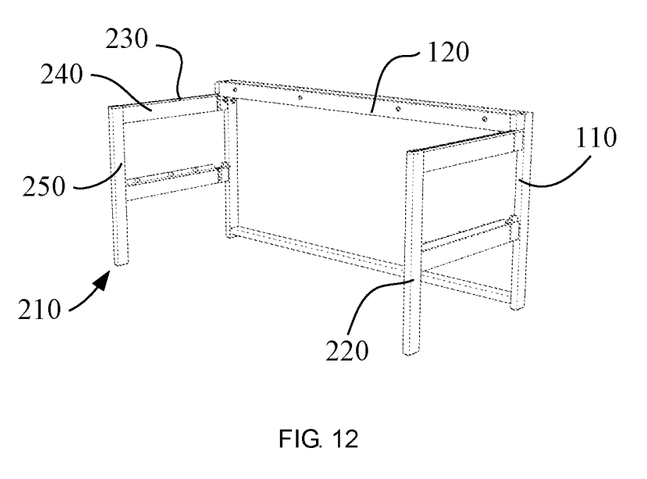
FIG. 12 shows a perspective view of one of the folding steps of the foldable food serving cart as in FIG. 1.
Figure 13:
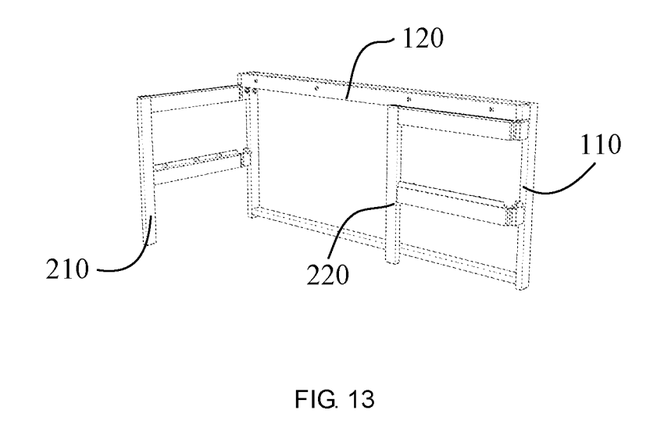
FIG. 13 shows a perspective view of one of the folding steps of the foldable food serving cart as in FIG. 1.
Figure 14:
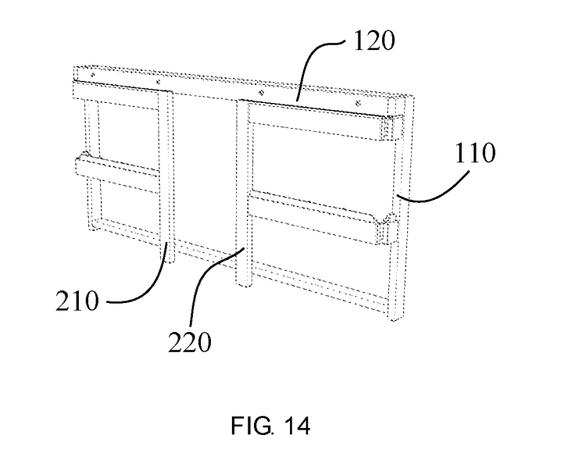
FIG. 14 shows a perspective view of one of the folding steps of the foldable food serving cart as in FIG. 1.

In one of the embodiments, a plurality of cooking modules 400 can be placed on top of the supporting frame for cooking food directly on the food serving cart. A power socket assembly 150 is provided on the first horizontal beam 120 for the cooking modules 400 to connect with. Specifically, as illustrated in FIG. 6, the power socket assembly 150 comprises aviation plugs 151, multifunctional sockets 152 and overload protectors 153; the aviation plugs 151 are electrically connected to the electric circuit assembly 700, so as to ensure connection between the cooking modules 400 and an external power supply through the power socket assembly 150. The multifunctional sockets 152 are connected with the cooking modules 400, and the multifunctional sockets 152 are provided with the overload protectors 153 respectively to ensure electrical safety. The electric circuit assembly 700 comprises power plugs 710 and electric circuit connecting wires 730; the power plugs 710 are adapted to connect to an external electric circuit; a first end of each electric connecting wire 730 is connected to a corresponding power plug 710, and a second end of which is connected to a corresponding aviation plug 151. Furthermore, the electric circuit assembly 700 also comprises electrical leakage protectors 720 to further enhance security of the entire electric circuit, thereby ensuring electrical safety.

As illustrated in FIGS. 7-14, steps of folding the foldable food serving cart of the present utility model are as follows:

S1, remove the baffle boards 500, and separate the supporting frame from the base stand 300;

S2, remove the electric circuit assembly 700;

S3, remove the cooking modules 400;

S4, slide the first horizontal beam 120 through the sliding grooves 230 towards the stand body 110, until the first horizontal beam 120 abuts to the stand body 110;

S5, remove the shelf boards 600;

S6, rotate the second side stand 220 inward until the vertical rod 250 of the second side stand 220 abuts to the stand body 110;

S7, rotate the first side stand 210 inward until the vertical rod 250 of the first side stand 210 abuts to the stand body 110 to complete folding operation of the food serving cart.

Certainly, during actual operation, it is not necessary to strictly follow the above step sequences; for examples, it is not necessary to remove the baffle boards 500 in a first step, but they can be removed in subsequence steps; in some specific circumstances, the baffle boards 500 can be folded together with the supporting frame for storage without being removed; the same applies to removals of the base stand 300, the electric circuit assembly 700, the cooking modules 400 and the shelf boards 600, and folding sequence of the first side stand 210 and the second side stand 220; as long as an overall disassembling and folding process is not affected, operating step sequences are not specifically limited.

By analogy, the food serving cart can be unfolded by reversing the steps above, which is simple and convenient to operate.

It should be understood that, the expressions "a body" or "a part" may refer to a portion of a "component"; namely, the "body" or "part" and "other portions of a component" may be manufactured as a one whole piece. The expressions "a body" or "a part" may also refer to an independent component separable from "other portions of a component"; namely, the "body" or "part" may be manufactured independently and then combined with "other portions of a component" to form as a whole. The expressions "a body" or "a part" of the present application are only applied as an embodiment for ease of reading, but not intended to set a limit to the protection scope of the present utility model;

technical solutions containing the aforementioned features with the same effects should be understood as equivalents to the present application.

It should be understood that, components included by the expressions "a unit", "an assembly", "a mechanism" or "a device" of the present application may be flexibly assembled; namely, the aforementioned components may be modularly manufactured according to actual needs, which is convenient for modular assembly. The distinctions of the aforementioned components are only applied as an embodiment for ease of reading, but not intended to set a limit to the protection scope of the present utility model; technical solutions containing the aforementioned components with the same effects should be understood as equivalents to the present application.

In the description of the present utility model, it should be understood that, the terms "center", "lengthwise", "widthwise", "length", "width", "thickness", "upper", "lower", "front", "rear", "left", "right", "vertical", "horizontal", "top", "bottom", "inner", "outer", "clockwise", "counterclockwise", "axial", "radial", "circumferential" and so forth that indicate orientations or positional relationship, are based on the orientations or positional relationship shown in the drawings, which are only for the convenience of describing the present utility model and the sake of simplicity, but not indicating or implying that the device or element referred to must have a specific orientation, or be constructed and operated in a specific orientation, and thus should not be understood as a limit to the present utility model. The term "and/or" in the present utility model includes any and all combinations of one or more of the associated listed items.

Furthermore, the terms "first" and "second" are only for descriptive purposes, and cannot be understood as indicating or implying relative importance or implicitly indicating the number of technical features indicated. Therefore, the features defined with "first" and "second" may explicitly or implicitly include one or more of these features. In the description of the present utility model, the meaning of "a plurality of" refers to two or more than two, unless otherwise specifically defined.

In the description of the present utility model, unless otherwise specified and restricted, the terms such as "mounted", "connected", "attached", "fixed" should be understood in a broad sense; for examples, the terms may refer to a fixed connection, a detachable connection, or connection as an integral component; they may refer to a mechanical connection or an electrical connection; they may refer to being directly connected, being indirectly connected through an intermediate medium, an internal communication between two components, or an interaction between two components. For those of ordinary skill in the art, the specific meanings of the aforementioned terms in the present utility model can be understood according to specific circumstances.

In the description of the present utility model, unless otherwise specified and restricted, a first feature being "above" or "below" a second feature may refer to the direct contact of the first and second features, or the indirect contact of the first and second features through an integral component in between. In addition, the first feature being "on top of", "above" and "on" the second feature may refer to the conditions that the first feature is directly above or obliquely above the second feature, or merely indicate that the first feature is at a higher horizontal level than the second feature. The first feature being "beneath", "below" and "under" the second feature may refer to the conditions that the first feature is directly below or obliquely below the second feature, or merely indicate that the first feature is at a lower horizontal level than the second feature.

It should be understood that, when a component is described as "fixed to", "arranged on", "attached to" or "mounted to" another component, it may refer to conditions that the component is directly on top of another component, or being above another component while an additional component exists in between. When a component is described as "connect to" another component, it may refer to conditions that the component is directly connected to another component, or being connected to another component while an additional component exists in between. Furthermore, when a component is described as "in a fixed driving connection" to another component, it may refer to conditions that the two components are detachably fixed or undetachably fixed, and any type of connection that can achieve power transmission, such as sleeving, snap-fitting, integral molding, welding and so forth, which can be realized in the prior art, are possible, and will not be described in detail herein. When a component is mutually perpendicular or approximately perpendicular to another component, it refers to a condition that the two components are ideally perpendicular to each other, but certain tolerance may exist due to influences of manufacturing and assembling. The terms "vertical", "horizontal", "left", "right" and similar expressions are only intended for descriptive purposes, and cannot be understood as indicating the only implementation method. The term "and/or" in the present utility model includes any and all combinations of one or more of the associated listed items.

It should be understood that, when explaining the connection relationship or positional relationship of components, even without specific description, the connection relationship and positional relationship are interpreted as containing a range of tolerance; the particular range of tolerance should be within an acceptable range of tolerance determined by those skilled in the art; The terms like "around", "approximately" or "substantially" may refer to a condition within at least one standard deviation, which is not specifically limited herein.

The technical features of the above embodiments may be combined arbitrarily, but the specification does not describe all possible combinations of the technical features of the above embodiments for the sake of simplicity. It should be understood that any combination of the technical features should fall within the scope of the present utility model as long as the technical features when combined are compatible with each other.

The above embodiments are only some of the implementation methods of the present utility model described in greater details, but it cannot be understood as a limit to the protection scope of the present utility model. It should be noted that, all modifications and substitutions made by those skilled in the art without departing from the essence of the present utility model shall fall within the protection scope of the present utility model. Therefore, the scope of protection of the utility model shall be defined by the appended claims.

What is claimed is:

1. A foldable food serving cart, comprising
a stand (100), the stand (100) comprises a stand body (110);
a pair of side stands, the side stands comprises a first side stand (210) and a second side stand (220); the first side stand (210) and the second side stand (220) are rotatably connected to left and right sides of the stand body (110) respectively; a sliding groove (230) is provided on a top part of each of the first side stand (210) and the second side stand (220); the stand (100) further comprises a first horizontal beam (120); left and right sides of the first horizontal beam (120) are slidably connected to the sliding grooves (230) of the first side stand (210) and the second side stand (220) respectively;

a supporting frame is defined by the stand body (110), the first horizontal beam (120), the first side stand (210) and the second side stand (220); a top side of the supporting frame is disposed with cooking modules (400);

an electric circuit assembly (700) supplying power to the cooking modules (400);

a base stand (300), wherein the supporting frame is detachably connected on top of the base stand (300); a bottom part of the base stand (300) is provided with a plurality of wheels (310);

the stand body (110) comprises a second horizontal beam (130), and vertical beams (140) connected to left and right sides of the second horizontal beam (130) respectively; the first side stand (210) and the second side stand (220) are rotatably connected to the vertical beams (140) on left and right sides of the stand body (110) respectively.

2. The foldable food serving cart of claim 1, wherein the stand body (110) further comprises a bottom beam (160); two ends of the bottom beam (160) are connected to the vertical beams (140) respectively; a mounting frame whereon baffle boards (500) are mounted is defined by the bottom beam (160), the second horizontal beam (130) and the vertical beams (140).

3. The foldable food serving cart of claim 2, wherein mounting holes (141) on which the baffle boards (500) are mounted are provided on the vertical beams (140) on the left and right sides of the stand body (110).

4. The foldable food serving cart of claim 1, wherein each of the first side stand and the second side stand comprises a horizontal rod (240) and a vertical rod (250); a first end of the horizontal rod (240) is rotatably connected to the stand body (110); a second end of the horizontal rod (240) is connected to the vertical rod (250); the sliding groove (230) is arranged on a top part of the horizontal rod (240).

5. The foldable food serving cart of claim 4, wherein a middle part of each of the first side stand and the second side stand is provided with a supporting rod (260) whereon shelf boards (600) are mounted; a first end of the supporting rod (260) is rotatably connected to the stand body; a second end of the supporting rod (260) is connected to the corresponding vertical rod (250) of the corresponding side stand.

6. The foldable food serving cart of claim 1, wherein the wheels (310) are castor wheels.

7. The foldable food serving cart of claim 6, wherein the base stand (300) is provided with a plurality of insertion grooves (320) into which the supporting frame is inserted.

8. The foldable food serving cart of claim 1, wherein a power socket assembly (150) is provided on the first horizontal beam (120); the cooking modules (400) are connected to the power socket assembly (150); the power socket assembly (150) is connected to the electric circuit assembly (170).

9. The foldable food serving cart of claim 8, wherein the power socket assembly (150) comprises aviation plugs (151), multifunctional sockets (152) and overload protectors (153); the power socket assembly (150) is connected to the electric circuit assembly (700) through the aviation plugs (151).

* * * * *